(12) United States Patent
Wu

(10) Patent No.: US 11,856,069 B2
(45) Date of Patent: Dec. 26, 2023

(54) METHOD FOR DELETING USER EQUIPMENT AND RELATED DEVICE

(71) Applicant: Huawei Technologies Co., Ltd., Shenzhen (CN)

(72) Inventor: Zhunfeng Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/896,575

(22) Filed: Aug. 26, 2022

(65) Prior Publication Data

US 2022/0417341 A1  Dec. 29, 2022

Related U.S. Application Data

(63) Continuation of application No. PCT/CN2020/119469, filed on Sep. 30, 2020.

(30) Foreign Application Priority Data

Feb. 29, 2020  (CN) .......................... 202010132600.9

(51) Int. Cl.
*H04L 67/54* (2022.01)
*H04L 9/40* (2022.01)

(52) U.S. Cl.
CPC .......... *H04L 67/54* (2022.05); *H04L 63/0876* (2013.01)

(58) Field of Classification Search
CPC . H04L 67/54; H04L 63/0876; H04L 41/0803; H04L 63/0892; H04L 61/5007; H04L 61/5053; H04L 61/5076; G06F 9/5022; G06F 9/45558; G06F 9/547; G06F 2009/45595

USPC .......................................................... 709/224
See application file for complete search history.

(56) References Cited

U.S. PATENT DOCUMENTS

| | | | |
|---|---|---|---|
| 2017/0257276 | A1 | 9/2017 | Chou et al. |
| 2019/0334777 | A1 | 10/2019 | Chou et al. |

FOREIGN PATENT DOCUMENTS

| | | | |
|---|---|---|---|
| CN | 108011732 A | | 5/2018 |
| CN | 108512703 A | | 9/2018 |
| CN | 108616452 A | | 10/2018 |
| CN | 108737224 A | | 11/2018 |
| WO | 2017114362 A1 | | 7/2017 |
| WO | 2019042379 A1 | | 3/2019 |
| WO | 2019185013 A1 | | 10/2019 |

OTHER PUBLICATIONS

S. Hu, et al., "The China MObile, Huawei, and ZTE BNG, Simple Control and USer Plane Separation Protocol (S-CUSP)," draft-chz-simple-cu-separation-bng-protocol-06, Oct. 19, 2019, 132 pages.
H3c et al., "vBRAS principle and application introduction video-6W100," Aug. 19, 2019, 5 pages.

*Primary Examiner* — Karen C Tang
(74) *Attorney, Agent, or Firm* — Conley Rose, P.C.

(57) ABSTRACT

A method for deleting user equipment devices UEs in batches, where the method includes: A control device sends a delete instruction to a virtual broadband remote access server (vBRAS)-control plane (CP), where the delete instruction includes a target attribute, and where the vBRAS-CP instructs vBRAS-user plane (UP) devices to delete all user equipment devices meeting the target attribute according to the delete instruction.

20 Claims, 5 Drawing Sheets

METHOD FOR DELETING USER EQUIPMENT AND RELATED DEVICE

CROSS-REFERENCE TO RELATED APPLICATIONS

This is a continuation of International Patent Application No. PCT/CN2020/119469, filed on Sep. 30, 2020, which claims priority to Chinese Patent Application No. 202010132600.9, filed on Feb. 29, 2020. The disclosures of the aforementioned applications are hereby incorporated by reference in their entireties.

TECHNICAL FIELD

Embodiments of this application relate to the communications field, and in particular, to a method for deleting user equipment and a related device.

BACKGROUND

When a control plane (CP) and a user plane (UP) are separated, as a centralized control plane for user access management, a virtual broadband remote access server (vBRAS)-control plane (vBRAS-CP) device interacts with a control device, such as a remote authentication dial in user service (RADIUS) server, to complete authentication, authorization, and accounting for an access user.

When the control device expects to delete data of a user equipment (UE) from an entry of a vBRAS-user plane (vBRAS-UP) device, the control device sends a delete instruction for deleting the user equipment to the vBRAS-CP device, and the vBRAS-CP device instructs the vBRAS-UP device to delete the entry of the user equipment. This can reclaim an address and a related resource allocated to the user equipment.

When user equipment with some attributes needs to be deleted, the control device expects to send a delete instruction to the vBRAS-CP device for each user equipment with the attributes. In other words, a quantity of delete instructions is equal to that of the deleted UEs.

SUMMARY

Embodiments of this application provide a method for deleting user equipment, and to delete a plurality of UEs at the same time.

A first aspect of embodiments of this application provides a method for deleting user equipment. The method includes the following.

A vBRAS-CP device receives a delete instruction sent by a control device, where the delete instruction carries a target attribute. At least two UEs managed by the control device meet the target attribute, and the UEs meeting the target attribute are to be deleted. The vBRAS-CP device sends a delete entry operation to a vBRAS-UP device according to the delete instruction, to instruct the vBRAS-UP device to delete an entry of the user equipment corresponding to the target attribute, and release an address and a related resource of the UEs. The delete entry operation sent by the vBRAS-CP carries the target attribute.

When user equipment carrying the target attribute needs to be deleted, the control device only needs to send one delete instruction including the target attribute to the vBRAS-CP device, and the vBRAS-CP device instructs the vBRAS-UP device to delete all entries of the UEs carrying the target attribute according to the delete instruction. This can reduce packet interaction between the control device and the vBRAS-CP device when there are a plurality of UEs carrying the target attribute.

According to the first aspect of the embodiments of this application, in a first implementation of the first aspect of the embodiments of this application, after the vBRAS-CP device receives the delete instruction sent by the control device, the vBRAS-CP device may send a go-offline packet to the UEs meeting the target attribute based on the target attribute carried in the delete instruction. The go-offline packet instructs the user equipment corresponding to the target attribute to go offline.

In this embodiment of this application, when the control device needs to delete the UEs meeting the target attribute, the vBRAS-CP device may instruct the UEs meeting the target attribute to go offline. After receiving the go-offline packet, the UEs meeting the target attribute may determine that the UEs are beyond a management scope of the control device.

According to the first aspect or the first implementation of the first aspect of the embodiments of this application, in a second implementation of the first aspect of the embodiments of this application, the vBRAS-CP device may receive a user attribute sent by the user equipment, and store the user attribute. It may be understood that the target attribute belongs to the user attribute.

This embodiment of this application provides a method for obtaining the user attribute of the user equipment using the vBRAS-CP device.

According to any one of the first aspect to the second implementation of the first aspect of the embodiments of this application, in a third implementation of the first aspect of the embodiments of this application, the target attribute may include at least one of a user plane identity (UP-ID) or a domain.

This embodiment of this application provides a plurality of possible forms of the target attribute.

According to any one of the first aspect to the third implementation of the first aspect of the embodiments of this application, in a fourth implementation of the first aspect of the embodiments of this application, a manner of receiving the delete instruction from the control device by the vBRAS-CP device may be: The vBRAS-CP device receives the delete instruction sent by the control device using a disconnect message (DM) packet.

According to any one of the first aspect to the third implementation of the first aspect of the embodiments of this application, in the fourth implementation of the first aspect of the embodiments of this application, the control device may be any one of a RADIUS server or an equipment management system (EMS) server.

A second aspect of embodiments of this application provides a method for deleting user equipment. The method includes the following.

A vBRAS-UP device receives a delete entry operation sent by a vBRAS-CP device, where the delete entry operation carries a target attribute. The vBRAS-UP device deletes an entry of user equipment meeting the target attribute according to the delete entry operation, and releases an address and a related resource that are occupied by the user equipment.

When user equipment carrying the target attribute needs to be deleted, a control device only needs to send one delete instruction including the target attribute to the vBRAS-CP device, and the vBRAS-CP device instructs the vBRAS-UP device to delete the entry of the user equipment carrying the target attribute according to the delete instruction. When there are a plurality of UEs carrying the target attribute, packet interaction between the control device and the vBRAS-CP device may be reduced.

According to the second aspect of the embodiments of this application, in a first implementation of the second aspect of the embodiments of this application, the target attribute may include at least one of a user plane identity (UP-ID) or a domain.

A third aspect of embodiments of this application provides a method for deleting user equipment. The method includes the following.

A control device sends a delete instruction to a vBRAS-CP device, where the delete instruction includes a target attribute, the target attribute corresponds to at least two UEs. The delete instruction is used to instruct the vBRAS-CP device to send a delete entry operation that carries the target attribute to a vBRAS-UP device.

When two or more user equipment devices carrying the target attribute needs to be deleted, the control device only needs to send one delete instruction including the target attribute to the vBRAS-CP device, and the vBRAS-CP device instructs the vBRAS-UP device to delete an entry of each user equipment carrying the target attribute according to the delete instruction. This can reduce packet interaction between the control device and the vBRAS-CP device when there are a plurality of user equipment devices carrying the target attribute.

According to the third aspect, in a first implementation of the third aspect of the embodiments of this application, the target attribute may include at least one of a user plane identity (UP-ID) or a domain.

According to the third aspect or the first implementation of the third aspect of the embodiments of this application, in a second implementation of the third aspect of the embodiments of this application, a manner of sending the delete instruction to the vBRAS-CP device by the control device may be: The control device sends the delete instruction to the vBRAS-CP device using a disconnect message (DM) packet.

According to the first aspect to the second implementation of the first aspect of the embodiments of this application, in a third implementation of the first aspect of the embodiments of this application, the control device may be any one of a RADIUS server or an EMS server.

A fourth aspect of embodiments of this application provides a vBRAS-CP device. The vBRAS-CP device performs the method according to the first aspect.

A fifth aspect of embodiments of this application provides a vBRAS-UP device. The vBRAS-UP device performs the method according to the second aspect.

A sixth aspect of embodiments of this application provides a control device. The control device performs the method according to the third aspect.

A seventh aspect of this application provides a vBRAS-CP device. The vBRAS-CP device has functions of implementing the method according to the first aspect and the implementations of the first aspect. The vBRAS-CP device includes a processor and a transmission interface. The transmission interface is configured to receive or send data. The processor is configured to call software instructions stored in a memory, to perform an information transmission method according to the first aspect and the implementations of the first aspect.

An eighth aspect of this application provides a vBRAS-UP device. The vBRAS-UP device has functions of implementing the method according to the second aspect and the implementations of the second aspect. The vBRAS-UP device includes a processor and a transmission interface. The transmission interface is configured to receive or send data. The processor is configured to call software instructions stored in a memory, to perform the information transmission method according to the second aspect and the implementations of the second aspect.

A ninth aspect of this application provides a control device. The control device has functions of implementing the method according to the third aspect and the implementations of the third aspect. The control device includes a processor and a transmission interface. The transmission interface is configured to receive or send data. The processor is configured to call software instructions stored in a memory, to perform the information transmission method according to the third aspect and the implementations of the third aspect.

A tenth aspect of embodiments of this application provides a computer storage medium. The computer storage medium stores instructions. When the instructions are executed on a computer, the computer is enabled to perform the method according to any one of the first aspect to the third aspect.

An eleventh aspect of embodiments of this application provides a computer software product. When a computer program product runs on a computer, the computer is enabled to perform the method according to any one of the first aspect to the third aspect.

DESCRIPTION OF EMBODIMENTS

Figure 1:
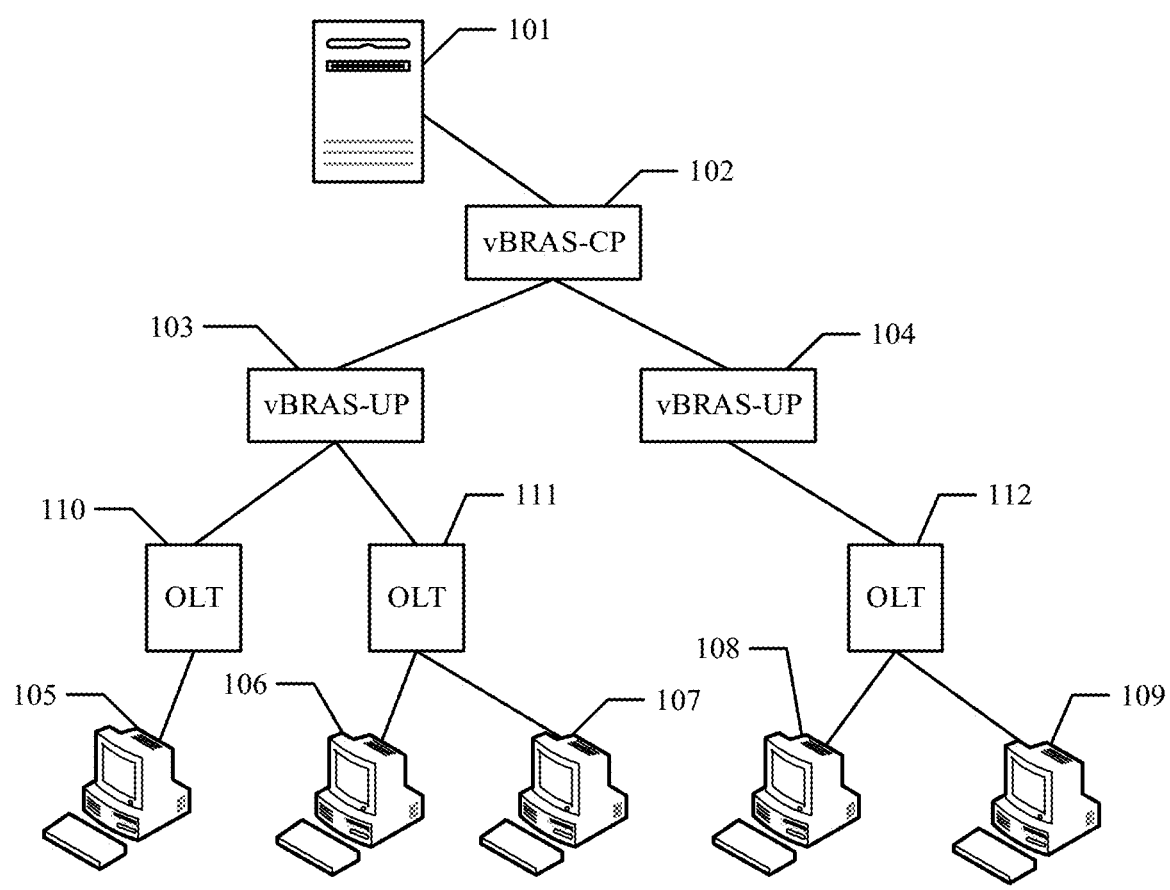
FIG. 1 is a schematic diagram of a network architecture according to an embodiment of this application.

Refer to FIG. 1. A network architecture in an embodiment of this application includes: a control device 101, a vBRAS-CP device 102, vBRAS-UP devices 103 and 104, and user equipment devices 105 to 109.

The control device 101 is configured to manage devices or perform authentication, authorization, and accounting for a user. In this embodiment of this application, the control device 101 may be a RADIUS server, or another device such as an equipment management system (EMS) server. This is not specifically limited herein.

The vBRAS-CP device 102 receives a delete instruction from the control device, and instructs the vBRAS-UP devices 103 and 104 to delete indicated user equipment according to the delete instruction.

The UEs 105 to 109 may be connected to the vBRAS-UP devices 103 and 104 using optical line terminals (OLTs) 110 to 112. In practice, one OLT may be connected to one user equipment, or may be connected to the plurality of UEs. The one vBRAS-UP device may be connected to the one OLT, or may be connected to a plurality of OLTs. This is not specifically limited herein.

This embodiment of this application describes a network architecture including the one control device 101, the one vBRAS-CP device 102, the two vBRAS-UP devices 103 and 104, and the five UEs 105 to 109 as an example. In practice, a quantity of devices may be another value not less than 1. For example, one control device, two vBRAS-CP devices, one vBRAS-UP device, and four UEs. This is not specifically limited herein.

Figure 2:
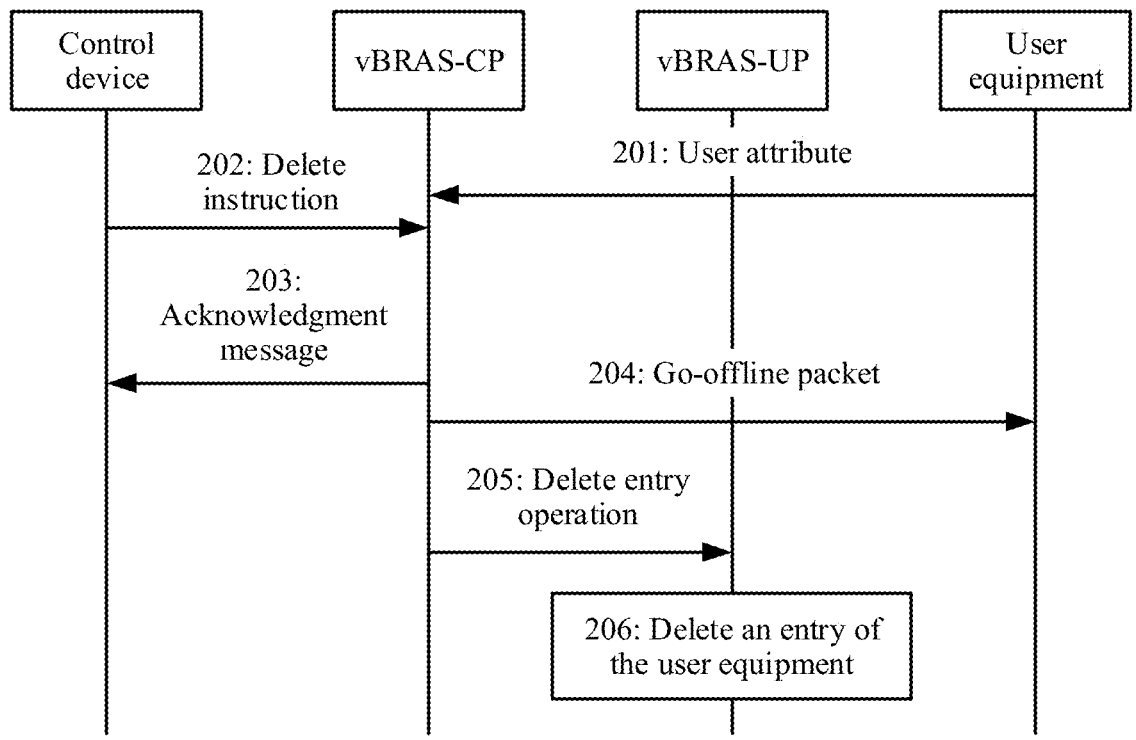
FIG. 2 is a schematic flowchart of an embodiment of this application.

Refer to FIG. 2. An embodiment of a method for deleting user equipment in an embodiment includes the following steps.

Step 201: A vBRAS-CP obtains a user attribute of a user equipment.

After accessing a network, the user equipment sends the user attribute to the vBRAS-CP device. The user attribute may include either a user plane identity (UP-ID) or a domain. It may be understood that the user attribute may alternatively be a physical or a software attribute of another user equipment. This is not specifically limited herein.

In application, a manner of obtaining the user attribute of the user equipment by the vBRAS-CP device is not limited to receiving from the user equipment, or obtaining from another third-party device. For example, if the user attribute is online duration of the user equipment, the vBRAS-CP device may obtain the user attribute from a timer.

Step 202: A control device sends a delete instruction to the vBRAS-CP device.

The delete instruction includes a target attribute. In this embodiment, the target attribute corresponds to two or more UEs, and the target attribute belongs to the user attribute. It may be understood that the user attribute may include a plurality of types, and the target attribute may also include a plurality of types, for example, including two types of the UP-ID and the domain.

After obtaining the user attribute of the user equipment, the vBRAS-CP device may report the user attribute to the control device. The control device may manage the user equipment based on the user attribute. It may be understood that the control device may further obtain the user attribute of the user equipment in another manner, for example, obtain from configuration instructions of a network administrator. If the user attribute is the online duration of the user equipment, the control device may obtain the user attribute from the timer of the online duration of a user.

In this example, if the user attribute is the UP-ID within a range of 0000 to FFFF, the target attribute may be that the UP-ID is within the range of 0000 to 0FFF, or the UP-ID is within the range of 0011 to 0111. This is not specifically limited herein.

In this example, if the control device is a RADIUS server, the delete instruction may be a DM packet. The DM packet carries the target attribute, that is, the range of the UP-ID.

Step 203: The vBRAS-CP device replies an acknowledge message to the control device.

The vBRAS-CP device may reply the acknowledge message to the control device after receiving the delete instruction. After receiving the acknowledge message, the control device confirms that the vBRAS-CP device has received the delete instruction.

In this example, if the control device is the RADIUS server, the acknowledge message may be a disconnect message (DM) acknowledge (ACK) character.

It may be understood that the step 203 may not be performed in the actual application. After the vBRAS-CP device receives the delete instruction, step 204 and subsequent steps may be directly performed. For example, if the control device is an EMS server, the EMS server may send the delete instruction to the vBRAS-CP device through the simple network management protocol (SNMP), the network configuration (netconf) protocol, or the yet another next generation (YANG) protocol.

Step 204: The vBRAS-CP sends a go-offline packet to the user equipment.

After receiving the delete instruction, the vBRAS-CP device may send the go-offline packet to user equipment indicated by the delete instruction, that is, the user equipment meeting the target attribute, to instruct the user equipment to go offline.

Step 205: The vBRAS-CP device sends a delete entry operation to the vBRAS-UP device.

After receiving the delete instruction, the vBRAS-CP device may send the delete entry operation that carries the target attribute to the vBRAS-UP device. The delete entry operation instructs the vBRAS-UP device to delete an entry of the user equipment meeting the target attribute.

Step 206: The vBRAS-UP deletes the entry of the user equipment.

The vBRAS-UP device deletes the entry of the user equipment meeting the target attribute according to the delete entry operation sent by the vBRAS-CP device, and reclaims an address and a related resource of the user equipment.

An execution sequence of the foregoing steps is merely an example. There may be different execution sequences in another design. For example, the step 201 may alternatively be performed after the step 202. For another example, a sequence of the step 204 and the step 205 may be exchanged.

It may be understood that in the actual application, there may be a plurality of target attributes carried in the delete entry operation. For example, if the target attribute includes the UP-ID and the domain, it may be specified that the vBRAS-UP device deletes a user equipment whose UP-ID is within a preset range and whose domain meets a preset condition. In other words, the vBRAS-UP device deletes each of the user equipment devices that meets both target attributes of the UP-ID and the domain. Alternatively, it may be specified that the vBRAS-UP device deletes a user equipment whose UP-ID is within the preset range or whose domain meets the preset condition. In other words, the vBRAS-UP device deletes each of the user equipment devices that meets one of the two target attributes of the UP-ID and the domain. This is not specifically limited herein.

The above describes the method for deleting the user equipment in the embodiments of this application, and the following describes a device in the embodiments of this application.

Figure 3:
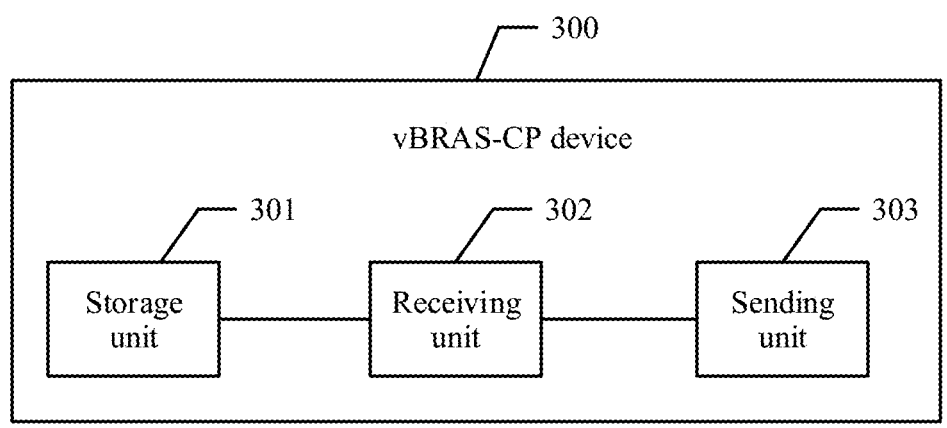
FIG. 3 is a schematic diagram of a structure of a vBRAS-CP device according to an embodiment of this application.

Refer to FIG. 3. An embodiment of a vBRAS-CP device 300 in an embodiment of this application includes: a storage unit 301 configured to store a user attribute of at least two UEs; a receiving unit 302 configured to receive a delete instruction from a control device, e.g., configured to receive the delete instruction from the control device using a DM packet, and further configured to receive the user attribute of the at least two UEs from the at least two UEs; and a sending unit 303 configured to send a delete entry operation to a vBRAS-UP device, and further configured to send a go-offline packet to each user equipment corresponding to the target attribute.

In this embodiment, operations performed by the units in the vBRAS-CP device 300 are similar to those described in the embodiment shown in FIG. 2. This is not described herein again.

Figure 4:
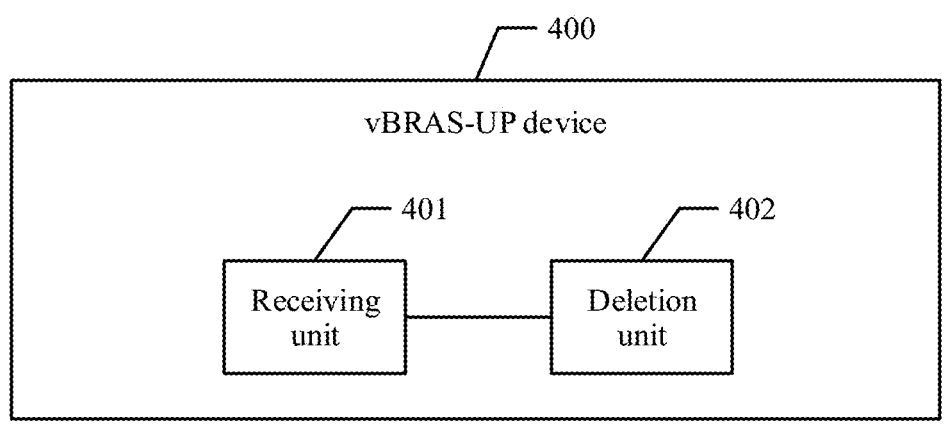
FIG. 4 is a schematic diagram of a structure of a vBRAS-UP device according to an embodiment of this application.

Refer to FIG. 4. An embodiment of a vBRAS-UP device 400 in an embodiment of this application includes: a receiving unit 401 configured to receive a delete entry operation from a vBRAS-CP device, and a deletion unit 402 configured to delete, based on the target attribute, an entry of each user equipment corresponding to a target attribute.

In this embodiment, operations performed by the units in the vBRAS-UP device 400 are similar to those described in the embodiment shown in FIG. 2. This is not described herein again.

Figure 5:
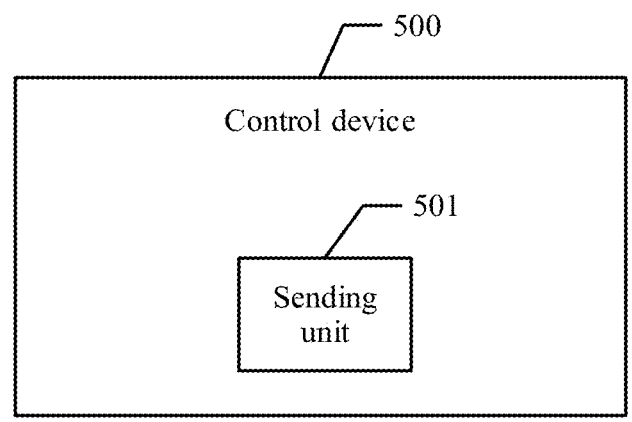
FIG. 5 is a schematic diagram of a structure of a control device according to an embodiment of this application.

Refer to FIG. 5. An embodiment of a control device 500 in an embodiment of this application includes: a sending unit 501 configured to send a delete instruction to a vBRAS-CP device, and configured to send the delete instruction to the vBRAS-CP device using a DM packet.

In this embodiment, operations performed by the units in the control device 500 are similar to those described in the embodiment shown in FIG. 2. This is not described herein again.

Figure 6:
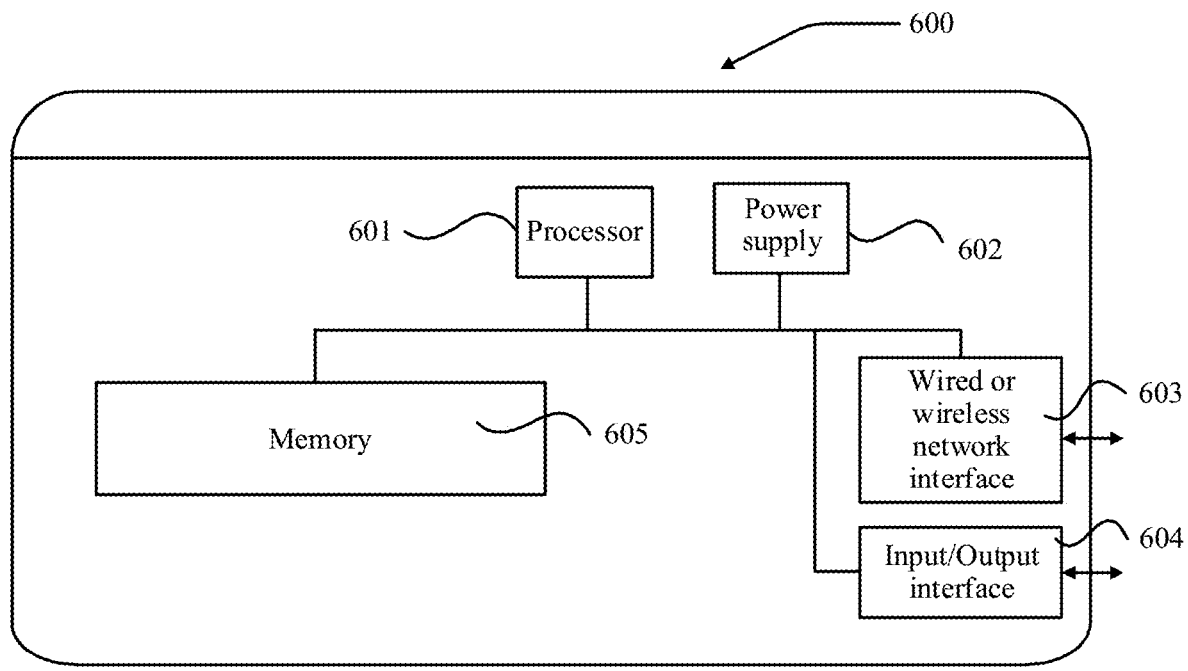
FIG. 6 is a schematic diagram of another structure of a vBRAS-CP device according to an embodiment of this application.

Refer to FIG. 6. An embodiment of this application provides a vBRAS-CP device 600. The vBRAS-CP device 600 may include one or more processors 601 and a memory 605. The memory 605 stores program code. Further, the memory 605 may store data.

The memory 605 may be a volatile memory, a nonvolatile memory, or a persistent storage device. The program code stored in the memory 605 may include one or more modules, and each module may include a series of instruction operations for the vBRAS-CP device. Further, the processor 601 may be configured to communicate with the memory 605, and perform the series of instruction operations in the memory 605 on the vBRAS-CP device 600.

The vBRAS-CP device 600 may further include one or more power supplies 602, one or more wired or wireless network interfaces 603, one or more input/output interfaces 604, and/or one or more operating systems, such as Windows, Android, Mac OS, iOS, Unix, Linux, and FreeBSD.

The processor 601 may perform the operations performed by the vBRAS-CP device in the embodiment shown in FIG. 2. This is not specifically described herein again.

Figure 7:
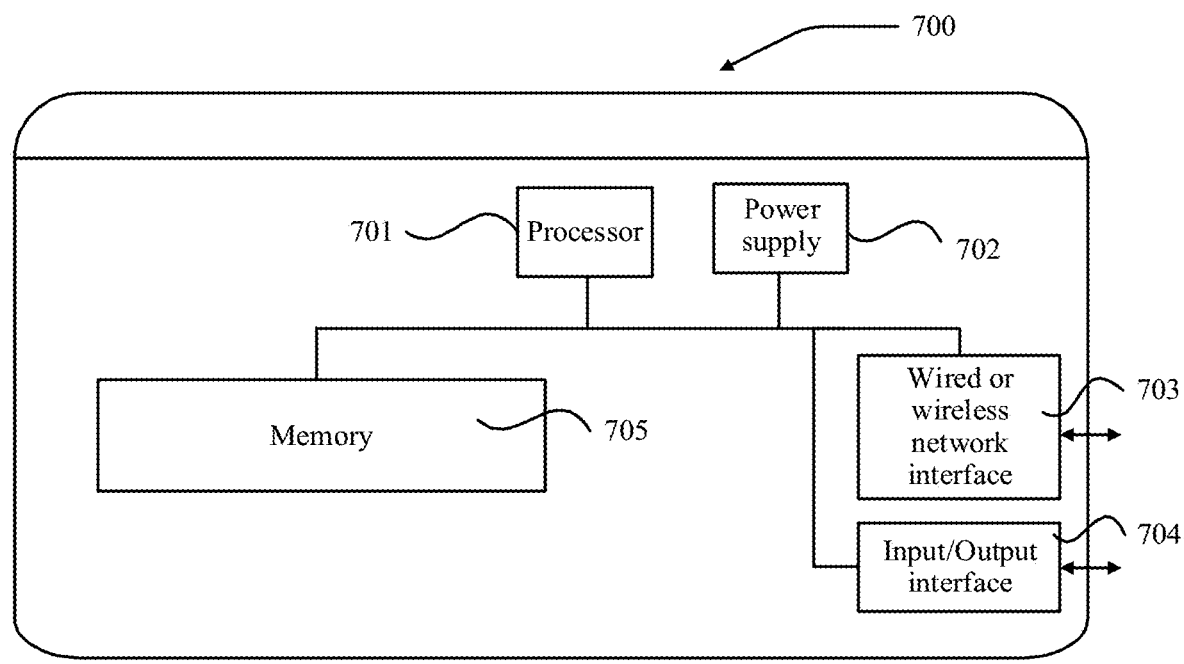
FIG. 7 is a schematic diagram of another structure of a vBRAS-UP device according to an embodiment of this application.

Refer to FIG. 7. An embodiment of this application provides a vBRAS-UP device 700. The vBRAS-UP device 700 may include one or more processors 701 and a memory 705. The memory 705 stores program code. Further, the memory 705 may store data.

The memory 705 may be a volatile memory, a nonvolatile memory, or a persistent storage device. The program code stored in the memory 705 may include one or more modules, and each module may include a series of instruction operations for the vBRAS-UP device. Further, the processor 701 may be configured to communicate with the memory 705, and perform the series of instruction operations in the memory 705 on the vBRAS-UP device 700.

The vBRAS-UP device 700 may further include one or more power supplies 702, one or more wired or wireless network interfaces 703, one or more input/output interfaces 704, and/or one or more operating systems, such as Windows, Android, Mac OS, iOS, Unix, Linux, and FreeBSD.

The processor 701 may perform the operations performed by the vBRAS-UP device in the embodiment shown in FIG. 2. This is not specifically described herein again.

Figure 8:
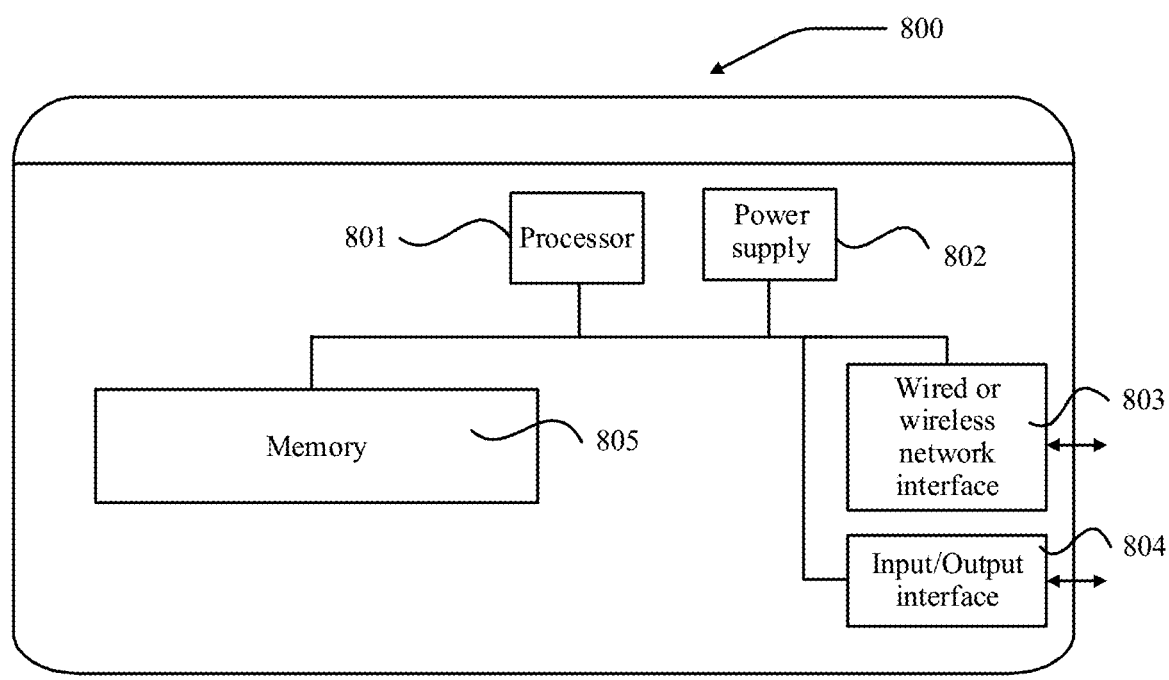
FIG. 8 is a schematic diagram of another structure of a control device according to an embodiment of this application.

Refer to FIG. 8. An embodiment of this application provides a control device 800. The control device 800 may include one or more processors 801 and a memory 805. The memory 805 stores program code. Further, the memory 805 may store data.

The memory 805 may be a volatile memory, a nonvolatile memory, or a persistent storage device. The program code stored in the memory 805 may include one or more modules, and each module may include a series of instruction operations for the control device. Further, the processor 801 may be configured to communicate with the memory 805, and perform the series of instruction operations in the memory 805 on the control device 800.

The control device 800 may further include one or more power supplies 802, one or more wired or wireless network interfaces 803, one or more input/output interfaces 804, and/or one or more operating systems, such as Windows, Android, Mac OS, iOS, Unix, Linux, and FreeBSD.

The processor 801 may perform the operations performed by the control device in the embodiment shown in FIG. 2. This is not specifically described herein again.

An embodiment of this application further provides a computer-readable storage medium. The computer-readable storage medium stores a computer program. When the computer program is executed by a computer, a method procedure related to a control device, a vBRAS-CP device, or a vBRAS-UP device in any one of the foregoing method embodiments is implemented. Correspondingly, the computer may be the control device, the vBRAS-CP device, or the vBRAS-UP device.

It should be understood that a processor mentioned in the control device, the vBRAS-CP device, or the vBRAS-UP device in the embodiments of this application, or the processor provided in the embodiments of this application may be a central processing unit (CPU), or may be another general-purpose processor, a digital signal processor (DSP), an application specific integrated circuit (ASIC), a field programmable gate array (FPGA) or another programmable logic device, a discrete gate or a transistor logical device, a discrete hardware assembly, or the like. The general-purpose processor may be a microprocessor, any conventional processor, or the like.

It should be further understood that there may be one or more processors in the control device, the vBRAS-CP device, or the vBRAS-UP in the embodiments of this application. The quantity may be adjusted based on an actual application scenario. This is merely an example for description herein, and is not limited. There may be one or more memories in the embodiments of this application. The quantity may be adjusted based on an actual application scenario. This is merely an example for description herein, and is not limited.

It should also be understood that the memory or the readable storage medium mentioned in the control device, the vBRAS-CP device, or the vBRAS-UP device in the embodiments of this application may be a volatile memory or a non-volatile memory, or both the volatile memory and the non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM) that is used as a cache. Through example but not limitative descriptions, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be further noted that when the control device, the vBRAS-CP device, or the vBRAS-UP device includes the processor (or a processing unit) and the memory, the processor in this application may be integrated with the memory, or may be connected to the memory using an interface. This may be adjusted based on an actual application scenario, and is not limited.

An embodiment of this application further provides a computer program or a computer program product including the computer program. When the computer program is executed on a computer, the computer is enabled to implement a method procedure related to the control device, the vBRAS-CP device or the vBRAS-UP device in any one of the foregoing method embodiments. Correspondingly, the computer may be the control device, the vBRAS-CP device, or the vBRAS-UP device.

All or some of the foregoing embodiments shown in FIG. 2 may be implemented using software, hardware, firmware, or any combination thereof. When software is used to implement the embodiments, all or some of the embodiments may be implemented in a form of a computer program product.

The computer program product includes one or more computer instructions. When computer program instructions are loaded and executed on the computer, all or some of procedures or functions according to the embodiments of this application are generated. The computer may be a general-purpose computer, a dedicated computer, a computer network, or another programmable apparatus. The computer instructions may be stored in the computer-readable storage medium or may be transmitted from one computer-readable storage medium to another computer-readable storage medium. For example, the computer instructions may be transmitted from a web site, a computer, a server, or a data center to another website, another computer, another server, or another data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the embodiments provided in this application, it should be understood that the system, the apparatus, and the method disclosed in this application may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in one storage medium and includes several instructions for instructing a computer device (which may be a personal computer, the server, or another network device) to perform all or some of the steps of the methods described in the embodiment in FIG. 2 of this application. The storage medium includes various media that can store the program code, such as a Universal Serial Bus (USB) flash drive, a removable hard disk, a read-only memory (ROM), a random-access memory (RAM), a magnetic disk, or an optical disc.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any other variants mean to cover the non-exclusive inclusion, such that a process, method, system, product, or device that includes a series of units is not necessarily limited to those units, but may include other units not expressly listed or inherent to such a process, method, product, or device.

Names of messages/frames/information, modules, units, or the like provided in the embodiments of this application are merely examples, and other names may be used provided that the messages/frames/information, modules, units, or the like have same functions.

The terms used in embodiments of this application are merely for the purpose of illustrating example embodiments, and are not intended to limit the present disclosure. The terms "a", "the", and "this" of singular forms used in embodiments and the appended claims of this application are also intended to include plural forms, unless otherwise specified in a context clearly. In the descriptions of this application, "I" represents an "or" relationship between associated objects unless otherwise specified. For example, AB may represent A or B. The term "and/or" in this application is merely an association relationship for describing associated objects, and represents that three relationships may exist. For example, A and/or B may represent the following three cases: Only A exists, both A and B exist, and only B exists, where A and B each may be singular or plural.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A network device applied to a virtual broadband remote access server (vBRAS)-control plane (CP) device, the network device comprising:
   at least one processor;
   one or more memories coupled to the at least one processor and configured to store instructions that, when executed by the at least one processor, cause the network device to:
      receive a delete instruction from a control device, wherein the delete instruction comprises a target attribute corresponding to at least two user equipment devices; and
      send a delete entry operation to a vBRAS-user plane (UP) device, wherein the delete entry operation instructs the vBRAS-UP device to delete an entry of the at least two user equipment devices, and wherein the delete entry operation comprises the target attribute.

2. The network device according to claim 1, wherein the at least one processor is configured to execute the instructions to further cause the network device to send a go-offline packet to the at least two user equipment devices, and wherein the go-offline packet instructs the at least two user equipment devices to go offline.

3. The network device according to claim 1, wherein the at least one processor is configured to execute the instructions to further cause the network device to:
   receive, from the at least two user equipment devices, user attributes of the at least two user equipment devices; and
   store the user attributes of the at least two user equipment devices.

4. The network device according to claim 1, wherein the target attribute comprises a user plane identity (UP-ID).

5. The network device according to claim 1, wherein the target attribute comprises a domain.

6. The network device according to claim 1, wherein the at least one processor is configured to execute the instructions to further cause the network device to receive the delete instruction from the control device using a disconnect message (DM) packet.

7. The network device according to claim 1, wherein the control device comprises a remote authentication dial in user service (RADIUS) server.

8. The network device according to claim 1, wherein the control device comprises an equipment management system (EMS) server.

9. A network device applied to a virtual broadband remote access server (vBRAS)-user plane (UP) device, the network device comprising:
   at least one processor;
   one or more memories coupled to the at least one processor and configured to store instructions that, when executed by the at least one processor, cause the network device to:
      receive a delete entry operation from a vBRAS-control plane (CP), wherein the delete entry operation comprises a target attribute corresponding to at least two user equipment devices; and
      delete an entry of the at least user equipment devices based on the target attribute in the delete entry operation.

10. The network device according to claim 7, wherein the target attribute comprises a user plane identity (UP-ID).

11. The network device according to claim 7, wherein the target attribute comprises a domain.

12. The network device according to claim 7, wherein the target attribute comprises a domain and a user plane identity (UP-ID).

13. A network system comprising:
   a virtual broadband remote access server (vBRAS)-control plane (CP) device configured to:
      receive a delete instruction from a control device, wherein the delete instruction comprises a target attribute corresponding to at least two user equipment devices; and
      send a delete entry operation to instruct deleting an entry of the at least two user equipment devices, wherein the delete entry operation comprises the target attribute; and
   a vBRAS-user plane (UP) device configured to:
      receive the delete entry operation from the vBRAS-CP; and
      delete the entry of the at least user equipment devices based on the target attribute.

14. The network system according to claim 13, wherein the vBRAS-CP device is configured to send a go-offline packet to the at least two user equipment devices, and wherein the go-offline packet instructs the at least two user equipment devices to go offline.

15. The network system according to claim 13, wherein the vBRAS-CP device is configured to:
   receive, from the at least two user equipment devices, user attributes of the at least two user equipment devices, wherein the user attributes comprise the target attribute; and
   store the user attributes of the at least two user equipment devices.

16. The network system according to claim 13, wherein the target attribute comprises a user plane identity (UP-ID).

17. The network system according to claim 13, wherein the target attribute comprises a domain.

18. The network system according to claim 13, wherein the vBRAS-CP device is configured to receive the delete instruction from the control device using a disconnect message (DM) packet.

19. The network system according to claim 13, wherein the control device comprises a remote authentication dial in user service (RADIUS) server.

20. The network system according to claim 13, wherein the control device comprises an equipment management system (EMS) server.

* * * * *